United States Patent
Greenwood

(10) Patent No.: US 7,512,217 B2
(45) Date of Patent: Mar. 31, 2009

(54) SYSTEM AND METHOD FOR COMMUNICATING WITH INSTANT MESSAGING CLIENTS USING A TELEPHONE

(75) Inventor: Jon Michel Greenwood, Corona, CA (US)

(73) Assignee: Gateway Inc., Irvine, CA (US)

( * ) Notice: Subject to any disclaimer, the term of this patent is extended or adjusted under 35 U.S.C. 154(b) by 1045 days.

(21) Appl. No.: 10/805,820

(22) Filed: Mar. 22, 2004

(65) Prior Publication Data

US 2004/0186909 A1    Sep. 23, 2004

Related U.S. Application Data

(63) Continuation-in-part of application No. 09/179,807, filed on Oct. 27, 1998, now abandoned.

(51) Int. Cl.
*H04M 11/06* (2006.01)
(52) U.S. Cl. .................. 379/88.14; 379/88.19; 704/260; 709/227
(58) Field of Classification Search .............. 379/93.24, 379/202.01, 388.01, 88.14, 88.19; 726/14; 342/27; 709/206, 227; 704/260
See application file for complete search history.

(56) References Cited

U.S. PATENT DOCUMENTS

| | | | |
|---|---|---|---|
| 5,729,604 A * | 3/1998 | Van Schyndel | 379/388.01 |
| 6,175,619 B1 * | 1/2001 | DeSimone | 379/202.01 |
| 6,259,692 B1 | 7/2001 | Shtivelman et al. | |
| 6,260,148 B1 * | 7/2001 | Aggarwal et al. | 726/14 |
| 6,282,269 B1 | 8/2001 | Bowater et al. | |
| 6,301,609 B1 | 10/2001 | Aravamudan et al. | |
| 6,304,565 B1 | 10/2001 | Ramamurthy | |
| 6,353,611 B1 | 3/2002 | Norris et al. | |
| 6,366,661 B1 | 4/2002 | Devillier et al. | |
| 6,373,835 B1 | 4/2002 | Ng et al. | |
| 6,484,196 B1 * | 11/2002 | Maurille | 709/206 |
| 2004/0005040 A1 * | 1/2004 | Owens et al. | 379/93.24 |

FOREIGN PATENT DOCUMENTS

WO    WO 01/86472 A1    11/2001

* cited by examiner

*Primary Examiner*—Gerald Gauthier
(74) *Attorney, Agent, or Firm*—Jeffrey A. Proehl; Woods Fuller Shultz & Smith

(57) ABSTRACT

Systems and methods allow a user at a telephone to communicate with an instant messaging client. The instant messaging client may be identified by a PIN that is entered on the telephone. Input from the telephone, include keypad and voice input may be converted to text that is displayed to the IM client. Text data received from the IM client may be converted to speech that is output to the telephone. A proximity detector may be used to determine the presence of an IM client user.

34 Claims, 4 Drawing Sheets

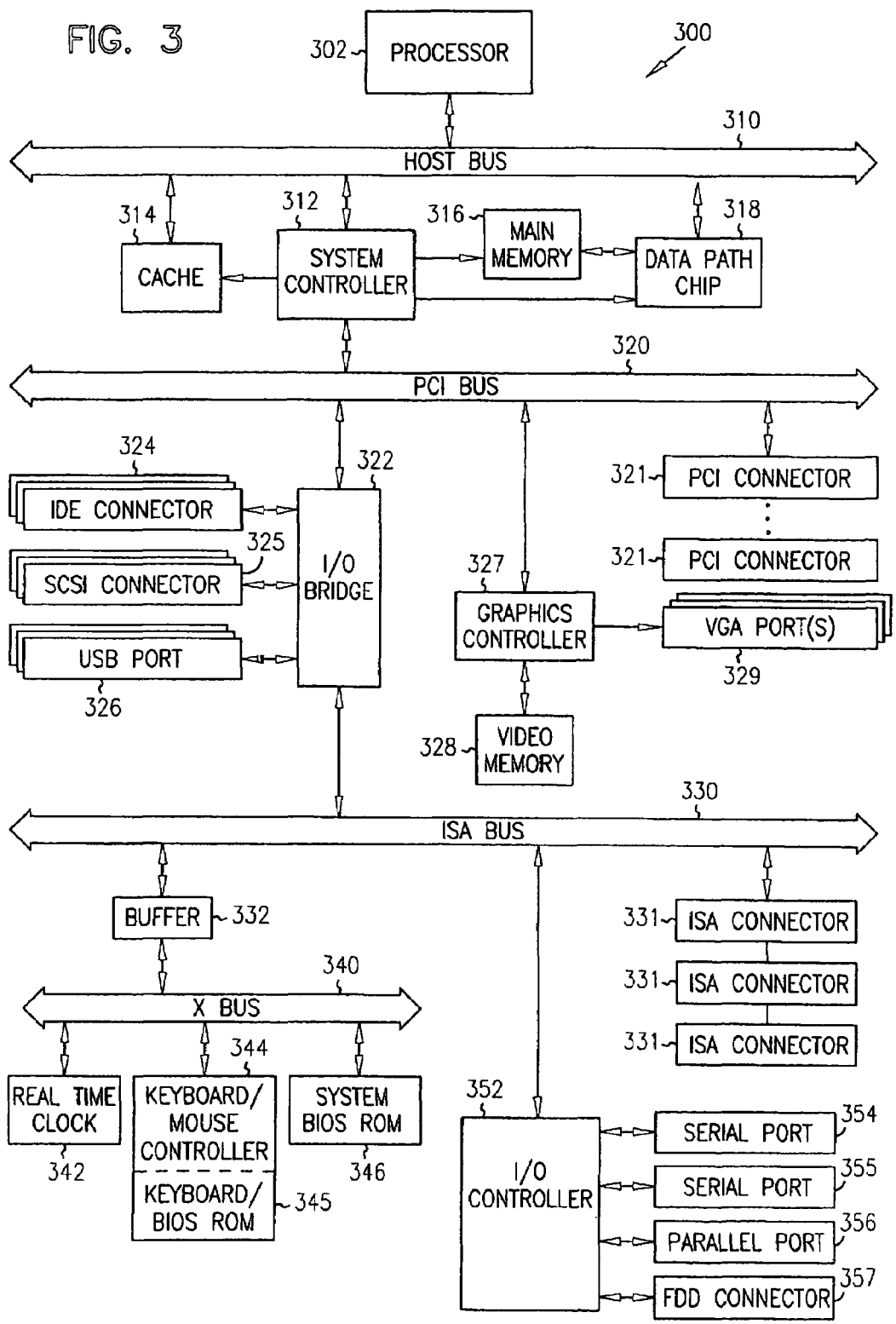

SYSTEM AND METHOD FOR COMMUNICATING WITH INSTANT MESSAGING CLIENTS USING A TELEPHONE

RELATED FILES

This application is a continuation-in-part of U.S. patent application Ser. No. 09/179,807, entitled "OFF-LINE PERSON NOTIFIER", filed Oct. 27, 1998 now abandoned; which is hereby incorporated by reference for all purposes.

FIELD OF THE INVENTION

The present invention relates to systems and methods for instant messaging communications, and in particular to providing voice telephone access to an instant messaging client.

BACKGROUND OF THE INVENTION

Instant messaging (IM) has become a common way for online users to communicate with one another. Typical instant messaging systems provide client programs that enable users to locate and establish an independent chat session with another user. Once connected, users can exchange comments in real time and with some systems, share files. As text is typed in on one user's computer system, it is displayed on the other's computer system and vice versa.

While instant messaging systems provide distinct advantages to online users, some problems exist. For example, in current systems, both parties in an instant message session must be at a computer. A person may desire to contact an individual who may be on-line and have access to their instant messaging clients, but that person does not have access to a computer. Alternatively, a person may need to reach someone who is on a dial-up system, and on-line, however the person cannot call them as their line is currently tied up by the computer.

In view of the above problems, there is a need in the art for the present invention.

SUMMARY OF THE INVENTION

The present invention includes systems and methods that allow a user at a telephone to communicate with an instant messaging client. The instant messaging client may be identified by a PIN that is entered on the telephone. Input from the telephone, including keypad and voice input may be converted to text that is displayed to the IM client. Text data received from the IM client may be converted to speech that is output to the telephone.

A further aspect of the system is that PIN data may be maintained in a database that maps PINs to IM user identifications. A single PIN may be used to map to multiple IM user identifications used by an individual.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIG. 3 is a block diagram of an example computer for implementing certain aspects of the present invention.

DETAILED DESCRIPTION OF THE INVENTION

Figure 1:
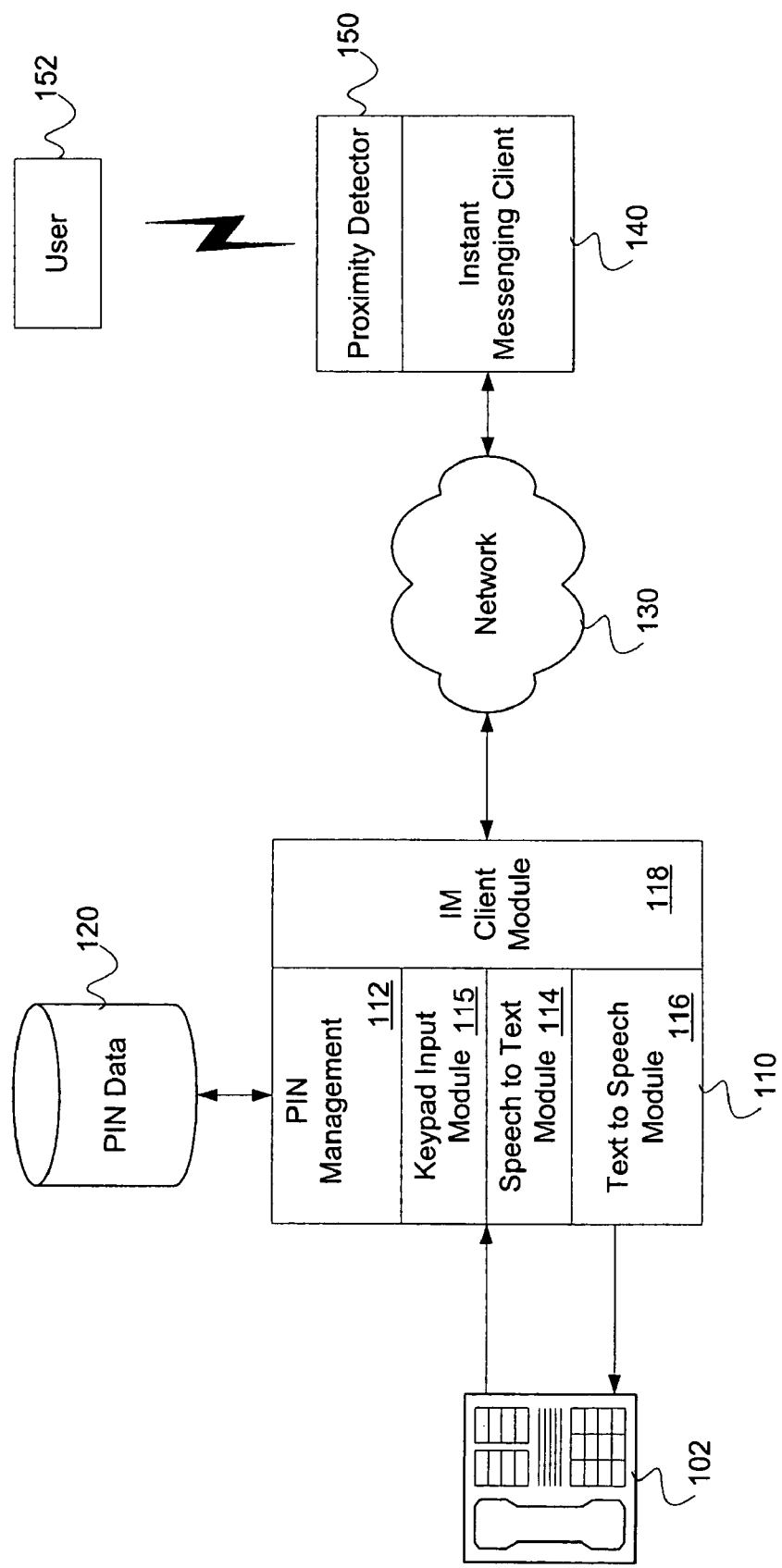
FIG. 1 is a block diagram illustrating an operating environment that includes systems according to an embodiment of the invention for contacting instant messaging clients using a telephone.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions that follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

The functions or algorithms described herein are implemented in software, human, or a combination of software and human implemented procedures in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware or any combination thereof. Multiple functions are performed in one or more modules as desired, and the embodiments described are merely examples. The software may be executed on a digital signal processor, ASIC, microprocessor, or other type of processor operating on a computer system, such as a personal computer, server or other computer system.

In the Figures, the same reference number is used throughout to refer to an identical component which appears in multiple Figures. Signals and connections may be referred to by the same reference number or label, and the actual meaning will be clear from its use in the context of the description.

The following detailed description is, therefore, not to be taken in a limiting sense, and the scope of the present invention is defined only by the appended claims.

Operating Environment

FIG. 1 is a block diagram illustrating an exemplary environment in which systems incorporating embodiments of the invention may be practiced. In some embodiments, the exemplary environment includes voice instant messaging (IM) server 110, pin database 120, telephone 102, and instant messaging client 140 communicably coupled to voice IM server 110 via a network 130.

Telephone 102 may be any type of device capable of providing voice and keypad signals to a telephone network. Telephone 102 may be a wired telephone device, or it may be a wireless device such as a cellular phone or a personal digital assistant (PDA) with cellular phone capability. The invention is not limited to any particular type of telephone device.

Telephone 102 is used to communicate with an instant messaging client 140 through voice IM server 110. IM client 140 may be any type of client program supporting instant messaging. Examples of such clients include AOL Instant Messenger from America Online, Inc., ICQ instant messaging from ICQ Inc., MSN Messenger from Microsoft Corp., and Yahoo Messenger from Yahoo!, Inc. As those of skill in the art will appreciate, other IM clients programs may be used and are within the scope of the invention.

In some embodiments, voice IM server 110 includes speech to text module 114, keypad input module 115, text to speech module 116, IM client module 118 and PIN management module 112. IM client module 118 is operable to communicate with an instant messaging client 140 over network 130. IM client module 118 in some embodiments of the invention supports communication with multiple IM clients 140, including the AOL Instant Messenger, ICS, MSN Messenger and Yahoo Messenger systems noted above.

Network 130 may be any type of wired or wireless network supporting communications between computers. In some embodiments of the invention, network 130 is the Internet. In alternative embodiments, network 130 comprises a private network such as a corporate intranet. The invention is not limited to any particular type of network.

In some embodiments, keypad input module 112 is operable to receive keypad input from telephone 102. Typically the keypad input comprises DTMF (Dual Tone Multi-Frequency) tones that identify a key that a user presses on telephone 102. In some embodiments, the keypad input comprises a Personal Identification Number (PIN) that is input to voice IM server 110 and received by keypad input module 115.

In some embodiments, a PIN database 120 contains data used to map a PIN to one or more user identifications valid on IM clients 140. As an example, an individual may use just one IM client, or a user may use multiple IM clients, each with their own user identification. In this case, a single PIN may be used for all the user identifications assigned to an individual. In some embodiments, the database may comprise a relational database management system such as Oracle, SQL Server, Sybase or Informix. In alternative embodiments, the database may comprise a file or files in a file system. The invention is not limited to any particular type of database to store PIN data.

PIN management module 112 comprises software used to create, read, update and delete records in PIN database 120. For example, PIN management module 112 may create and assign a PIN to a user when the user registers an IM user identification with the system. The IM user can then provide this PIN to any person the IM user desires in order to enable that person to contact the IM user with a telephone. Additionally, PIN management module 112 may read data from PIN database 120 in order to map the PIN to a user identification. The user identification may then be used to establish an IM session with an IM client 140.

Input for the session may be processed by keypad input module 115, or by speech to text module 114. If the input is keypad input, the keypad input module 115 translates the keypad input to text that is transmitted to an IM client 140, or to IM commands. If the input comprises voice signals, speech to text module 114 translates the speech to text that is transmitted to an IM client 140.

Text to speech module 116 receives text from an IM client 140 through IM client module 118, and translates the text to speech that is then transmitted to telephone 102. Additionally, text to speech module 116 translates command and status information received from IM client module 118 into speech that can be transmitted to telephone 102.

In some embodiments of the invention, a system incorporating IM client 140 may include a proximity detector 150. Proximity detector 150 may be any type of proximity detection mechanism. Examples of such proximity detection mechanisms include RFID (Radio Frequency Identifier) systems, ultrasonic proximity detection systems, and infrared proximity detection systems. Further, the proximity detection mechanism provided by the Bluetooth wireless communication protocol may be used in various embodiments of the invention. In some embodiments, the system may require the user to wear or carry a cooperating device. For example, in RFID based systems, the user may carry or wear an RFID tag. Similarly, in Bluetooth based systems, the user may wear or carry a Bluetooth enabled device.

In these embodiments, proximity detector 150 may determine a change in the presence of an IM client user and communicate that change to the IM client 140. For example, an IM client user 152 that is using an IM client 140 may leave the vicinity of the system. Proximity detector 150 senses that the IM client user 152 has left, and can set the status information for the IM client so that parties communicating with client user 152 may be informed that the user is no longer present. Examples of such status types are provided below.

In some embodiments, upon leaving the vicinity of the IM client 140 system, a timer starts. Status information indicating the user is no longer present is not set until the expiration of a timeout value. In these embodiments, the timeout value may be set so that the status information does not change when the user is not present for a relatively short period of time.

Additionally, when a client user 152 enters the vicinity of a system running IM client 140, the proximity detector detects the presence of the client user 152 using any of the mechanisms described above, and sets the status information for the IM client 140 to indicate that the client user 152 is present.

In alternative embodiments of the invention, if the IM client user that the user wishes to communicate with is not currently on-line, the IM client user may be notified using an off-line notification mechanism that a party desires to communicate with the IM client user. Additional details on these alternative embodiments of the invention may be found in U.S. patent application Ser. No. 09/179,807 entitled "OFF-LINE PERSON NOTIFIER" which has been previously incorporated by reference.

Further details on the operation of the above-described system will be provided below in the methods section.

Methods

Figure 2A:
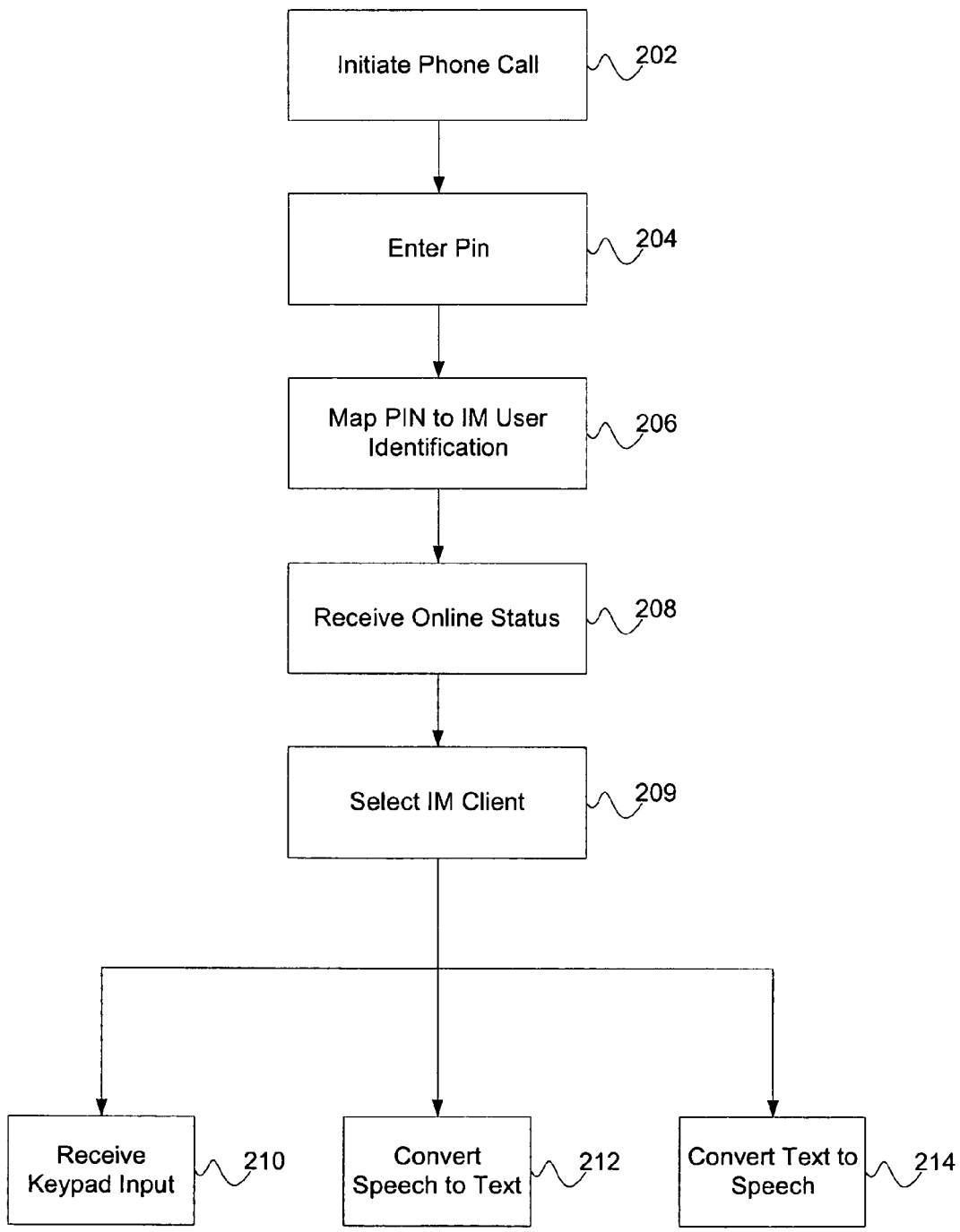
FIG. 2A is a flowchart illustrating a method according to an embodiment of the invention for contacting instant messaging clients using a telephone.

FIG. 2A is a flowchart illustrating a method according to an embodiment of the invention for communicating with an IM client using a telephone. The method to be performed by the constitute computer programs made up of computer-executable instructions. The computer-executable instructions may be read from a variety of computer-readable media, including but not limited to hard drives, floppy drives CD-ROMs, DVD-ROMs and signals transmitted over a wired or wireless network media. Describing the method by reference to a flowchart enables one skilled in the art to develop such programs including such instructions to carry out the methods on suitable computers (the processor or processors of the computer executing the instructions from computer-readable media). The method illustrated in FIG. 2A is inclusive of acts that may be taken by an operating environment executing an exemplary embodiment of the invention.

The method begins when a user initiate a phone call to a system executing the method, such as voice IM server 110 (block 202). In some embodiments of the invention, the phone call will be to a toll free number assigned to the system, such as an "800" number. After initiating the phone call, the system receives a PIN (block 204). In some embodiments of the invention, the PIN is entered on the keypad of the user's phone. In alternative embodiments of the invention, a user may speak the PIN and the system converts the speech to text.

Next, the system maps the PIN to one or more IM user identifications (block 206). Typically the mapping will be performed by consulting a database containing PIN mappings. In some embodiments of the invention, the user may enter an alphanumeric IM user identification directly using the keypad, rather than a PIN. In such embodiments it is not necessary to perform PIN mapping.

In some embodiments, the system executing the method provides the user with a current status for one or more of the IM user identifications associated with the PIN (block 208). The type of status information will vary depending on the IM client, and may include the following status information:

| | |
|---|---|
| Off-line | the IM user is not currently on-line. |
| On-line | the IM user is currently on-line. |
| Away | the IM user is currently on-line, but away from their computer. |
| Blocked | the IM user is currently blocking new connections. |
| Be Right Back | the IM user is currently on-line, however is currently not monitoring their session, but will be right back. |

Next, in some embodiments, the system receives a selection of one of the available IM user identifications and initiates an IM session with the selected IM user identification (block 210). In alternative embodiments, if no status information is available, or if only one IM user identification is mapped to the PIN, the system automatically initiates an IM session.

Blocks 210, 212 and 214 indicate activities that may occur in any order, and may occur in parallel with one another, and are thus shown at the same level in the flowchart. Further, the activities in blocks 210, 212 and 214 may occur in any combination of one or more of the activities.

In some embodiments, the system receives keypad input that may be converted to IM commands or text that is sent to an IM client (block 210). In particular, keys on the keypad can be assigned as "shortcuts" for commands or text. For example, a key may be assigned as a shortcut for terminating the IM session. Further, a key may be assigned as a short cut for a text string such as "please call me". In addition, keypad input may be converted to alphanumeric text that is then transmitted to an IM client.

In further embodiments, the system receives voice signals as input that may be converted to text (block 212). The text may then be sent to an IM client. In some embodiments, voice input may be interpreted as one or more commands for the IM session. In such embodiments, the user may introduce a command by speaking a recognized word or phrase that introduces the command. Speech other than IM commands may be converted to text for forwarding to the IM client.

The system also receives text input from an IM client that is converted to speech for output to a telephone (block 214), thereby allowing the user at a telephone to receive the information conveyed via the IM session. In addition, as noted above, status information regarding the IM session may be converted to speech and output to the telephone.

Figure 2B:
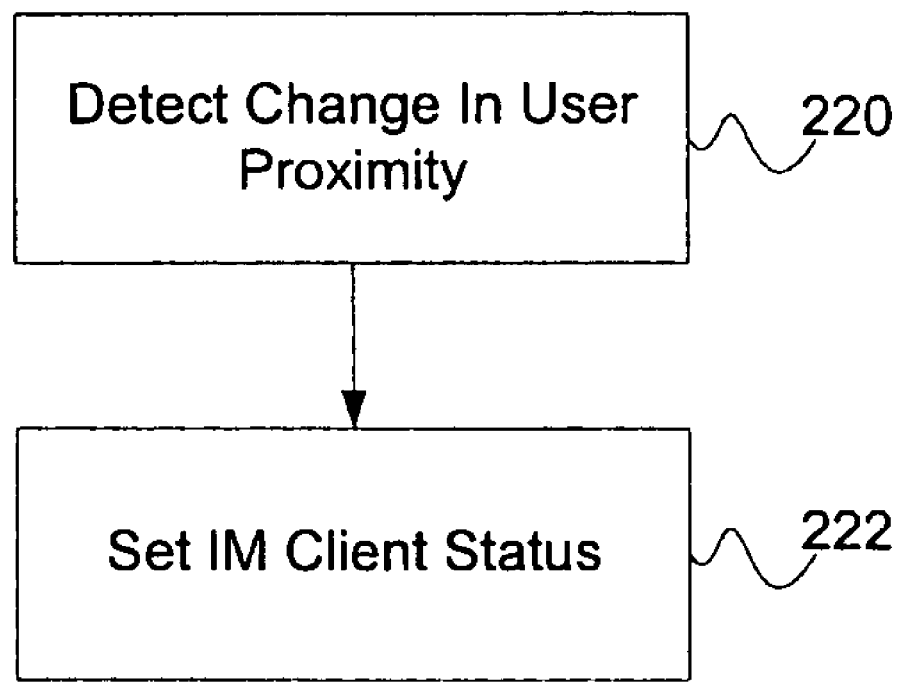
FIG. 2B is a flowchart illustrating a method according to an embodiment of the invention for maintaining instant message client status information according to an embodiment of the invention.

FIG. 2B is a flowchart illustrating a method according to an embodiment of the invention for maintaining status information for an IM client. The method illustrated in FIG. 2B is inclusive of acts that may be taken by an operating environment executing an exemplary embodiment of the invention.

The method begins when a system running an IM client detects a change in the proximity of a user (block 220). As detailed above, the change in proximity may be determined using passive or active proximity detection systems, such as RFID, ultrasonic, infrared, or Bluetooth proximity detection systems. The embodiments of the invention are not limited to a particular proximity detection mechanism.

Upon detecting a change in proximity, the system may change the status of the IM client depending on the change (block 222). Thus in some embodiments, if the proximity detection system determines that the IM client user is no longer present, the status of the IM client may be changed to a status indicating the IM client user is not present. Similarly, if the proximity detection system determines that the IM client user has returned to the system and is now present, the status of the IM client may be changed accordingly. An exemplary set of status values has been provide above.

Additionally, in some embodiments, a timeout mechanism may be used to determine a change in proximity. For example, if input activity such as keyboard or mouse activity is not present for a predetermined length of time, then the system may set an IM client status to indicated that the IM client user is not present. Conversely, the reoccurrence of input device activity such as keyboard or mouse activity may be used to set an IM client status to indicate that the IM client user is present.

FIG. 3 is a block diagram of a computer system 300 that shows components found in a common computer system such as a server computer capable of supporting various embodiments of the invention. Computer system 300 comprises a processor 302, a system controller 312, a cache 314, and a data-path chip 318, each coupled to a host bus 310. Processor 302 is a microprocessor such as a 486-type chip, a Pentium®, Pentium® II, Pentium® III, Pentium® 4, or other suitable microprocessor. Cache 314 provides high-speed local-memory data (in one embodiment, for example, 512 kB of data) for processor 302, and is controlled by system controller 312, which loads cache 314 with data that is expected to be used soon after the data is placed in cache 314 (i.e., in the near future). Main memory 316 is coupled between system controller 312 and data-path chip 318, and in one embodiment, provides random-access memory of between 16 MB and 256 MB or more of data. In one embodiment, main memory 316 is provided on SIMMs (Single In-line Memory Modules), while in another embodiment, main memory 316 is provided on DIMMs (Dual In-line Memory Modules), each of which plugs into suitable sockets provided on a motherboard holding many of the other components shown in FIG. 3. Main memory 316 includes standard DRAM (Dynamic Random-Access Memory), EDO (Extended Data Out) DRAM, SDRAM (Synchronous DRAM), or other suitable memory technology. System controller 312 controls PCI (Peripheral Component Interconnect) bus 320, a local bus for system 300 that provides a high-speed data path between processor 302 and various peripheral devices, such as graphics devices, storage drives, network interfaces, etc. Data-path chip 318 is also controlled by system controller 312 to assist in routing data between main memory 316, host bus 310, and PCI bus 320.

In one embodiment, PCI bus 320 provides a 32-bit-wide data path that runs at 33 MHz. In another embodiment, PCI bus 320 provides a 64-bit-wide data path that runs at 33 MHz. In yet other embodiments, PCI bus 320 provides 32-bit-wide or 64-bit-wide data paths that run at higher speeds. In one embodiment, PCI bus 320 provides connectivity to I/O bridge 322, graphics controller 327, and one or more PCI connectors 321 (i.e., sockets into which a card edge may be inserted), each of which accepts a standard PCI card. In one embodiment, I/O bridge 322 and graphics controller 327 are each integrated on the motherboard along with system controller 312, in order to avoid a board-connector-board signal-crossing interface and thus provide better speed and reliability. In the embodiment shown, graphics controller 327 is coupled to a video memory 328 (that includes memory such as DRAM, EDO DRAM, SDRAM, or VRAM (Video Random-Access Memory)), and drives VGA (Video Graphics Adaptor) port 329. VGA port 329 can connect to industry-standard monitors such as VGA-type, SVGA (Super VGA)-type, XGA-type (extended Graphics Adaptor) or SXGA-type (Super XGA) display devices.

Other input/output (I/O) cards having a PCI interface can be plugged into PCI connectors 321. Network connections providing video input are also represented by PCI connectors 321, and include Ethernet devices and cable modems for coupling to a high speed Ethernet network or cable network which is further coupled to the Internet. The network connections may be wired or wireless.

In one embodiment, I/O bridge 322 is a chip that provides connection and control to one or more independent IDE or SCSI connectors 324-325, to a USB (Universal Serial Bus) port 326, and to ISA (Industry Standard Architecture) bus 330. In this embodiment, IDE connector 324 provides connectivity for up to two standard IDE-type devices such as hard disk drives, CDROM (Compact Disk-Read-Only Memory) drives, DVD (Digital Video Disk) drives, videocassette recorders, or TBU (Tape-Backup Unit) devices. In one similar embodiment, two IDE connectors 324 are provided, and each provide the EIDE (Enhanced IDE) architecture. In the embodiment shown, SCSI (Small Computer System Interface) connector 325 provides connectivity for up to seven or fifteen SCSI-type devices (depending on the version of SCSI supported by the embodiment). In one embodiment, I/O bridge 322 provides ISA bus 330 having one or more ISA connectors 331 (in one embodiment, three connectors are provided). In one embodiment, ISA bus 330 is coupled to I/O controller 352, which in turn provides connections to two serial ports 354 and 355, parallel port 356, and FDD (Floppy-Disk Drive) connector 357. At least one serial port is coupled to a modem for connection to a telephone system providing Internet access through an Internet service provider. In one embodiment, ISA bus 330 is connected to buffer 332, which is connected to X bus 340, which provides connections to real-time clock 342, keyboard/mouse controller 344 and keyboard BIOS ROM (Basic Input/Output System Read-Only Memory) 345, and to system BIOS ROM 346.

CONCLUSION

Systems and methods for providing access to IM clients using a telephone have been described above. Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

What is claimed is:

1. A computerized method comprising:
    initiating a telephone session, said telephone session operable to receive input signals and send output voice signals;
    receiving a personal identification number (PIN) from a user initiating the telephone session, said personal identification number identifying one or more user identifications for one or more instant messaging (IM) clients;
    converting, when the input signals comprise text data from the one or more instant messaging clients, the text data to output voice signals; and
    converting, when the input signals are voice signals, the voice signals to text data and sending the text data to the one or more instant messaging clients.

2. The computerized method of claim 1, further comprising providing an online status for the one or more instant messaging clients to the telephone session.

3. The computerized method of claim 1, further comprising establishing one or more IM sessions with one or more IM clients corresponding to the PIN.

4. The computerized method of claim 1, further comprising recognizing the voice signals as instant messaging commands, and when voice signals are recognized as instant messaging commands, then causing the converting of the voice signals to instant messaging command data.

5. The computerized method of claim 1, wherein the input signals comprise keypad strokes.

6. The computerized method of claim 5, further comprising converting the keypad strokes signals to alphanumeric data and transmitting the alphanumeric data to the one or more instant messaging clients.

7. The computerized method of claim 5, further comprising converting the keypad strokes to instant messaging commands.

8. The method of claim 1 wherein the one or more instant messaging clients includes instant messaging clients selected from the group comprising AOL Instant Messenger, Yahoo Instant Messaging, ICQ, and MSN instant messaging.

9. The method of claim 1, wherein an instant messaging server is operable to receive said input signals and send said output voice signals.

10. A system for providing instant messaging, the system comprising:
an input module operable to receive input from a telephone;
a PIN management module operable to receive PIN data, said PIN data identifying an IM user;
an IM client module operable to establish an IM session with an IM client identified by the IM user; and
a text to speech module operable to convert text data to speech data for output to the telephone;
wherein the input module includes a speech to text module for receiving voice data from the telephone and converts the voice data to text data for output through the IM client module.

11. The system of claim 10 the input module includes a keypad input module for receiving keypad data from the telephone.

12. The system of claim 10, comprising a PIN database operable to maintain data mapping a PIN to an IM user identification.

13. A computer-readable medium having computer executable instructions for performing a method, the method comprising:
initiating a telephone session, said telephone session operable to receive input signals and send output voice signals;
receiving a personal identification number (PIN) from a user initiating the telephone session, said personal identification number identifying one or more user identifications for one or more instant messaging (IM) clients;
establishing one or more instant messaging (IM) sessions with one or more IM clients that correspond to the received PIN upon receiving the PIN; and
converting text data from the one or more instant messaging clients to output voice signals.

14. The computer-readable medium of claim 13, wherein the method further comprises providing an online status for the one or more instant messaging clients to the telephone session.

15. The computer-readable medium of claim 13, wherein the input signals are voice signals.

16. The computer-readable medium of claim 15, wherein the method further comprises converting the voice signals to text data and sending the text data to the one or more instant messaging clients.

17. The computer-readable medium of claim 15, wherein the method further comprises recognizing the voice signals as instant messaging commands.

18. The computer-readable medium of claim 13, wherein the input signals comprise keypad strokes.

19. The computer-readable medium of claim 18, wherein the method further comprises converting the keypad strokes signals to alphanumeric data and transmitting the alphanumeric data to the one or more instant messaging clients.

20. The computer-readable medium of claim 18, wherein the method further comprises converting the keypad strokes to instant messaging commands.

21. The computer-readable medium of claim 13, wherein the one or more instant messaging clients includes instant messaging clients selected from the group comprising AOL Instant Messenger, Yahoo Instant Messaging, ICQ, and MSN instant messaging.

22. The computer-readable medium of claim 13, wherein an instant messaging server is operable to receive input signals and send said output voice signals.

23. An instant messaging client system comprising:
an instant message (IM) client module; and
a proximity detector communicably coupled to the IM client module and operable to:
detect a change in the presence of an IM client user;
update an IM client status in accordance with the change in presence;
wherein the IM client module is selected from the group comprising AOL Instant Messenger, Yahoo Instant Messaging, ICQ, and MSN instant messaging.

24. The instant message client system of claim 23, wherein the proximity detector includes and RFID (Radio Frequency Identification) detector.

25. The instant message client of claim 23, wherein the proximity detector includes an ultrasonic detector.

26. The instant message client system of claim 23, wherein the proximity detector includes an infrared detector.

27. The instant message client system of claim 23, wherein the proximity detector is operable to detect change in physical proximity of the user to a computer on which the IM client module is operating.

28. A method for maintaining an IM client status, the method comprising:
detecting a change in proximity of a user of an IM client; and
updating an IM client status in accordance with the change in proximity;
wherein the IM client status is selected from the group comprising on line and off-line.

29. The method of claim 28, wherein detecting the change in proximity includes detecting that the user as come within a range of a proximity detector.

30. The method of claim 28, wherein detecting the change in proximity includes detecting that the user as exited a range of a proximity detector.

31. The method of claim 28, wherein detecting the change in proximity includes determining a lack of activity on an input device.

32. The method of claim 31, wherein determining a lack of activity includes determining a lack of activity for a predetermined timeout period.

33. The method of claim 28, wherein detecting the change in proximity includes determining the resumption of activity on an input device.

34. The method of claim 28, wherein the detecting of a change in proximity of a user to the IM client comprises detecting a physical proximity of the user to a computer on which the IM client is loaded.

* * * * *